United States Patent
Toshine

(10) Patent No.: US 7,664,910 B2
(45) Date of Patent: Feb. 16, 2010

(54) DATA MANAGEMENT METHOD AND APPARATUS, HIERARCHICAL STORAGE APPARATUS AND COMPUTER-READABLE STORAGE MEDIUM

(75) Inventor: Naoyoshi Toshine, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 226 days.

(21) Appl. No.: 11/089,005

(22) Filed: Mar. 24, 2005

(65) Prior Publication Data

US 2006/0136661 A1 Jun. 22, 2006

(30) Foreign Application Priority Data

Dec. 20, 2004 (JP) .............................. 2004-367935

(51) Int. Cl.
G06F 12/00 (2006.01)
G06F 12/08 (2006.01)

(52) U.S. Cl. ...................... 711/112; 711/4; 711/111; 711/170

(58) Field of Classification Search ................ None
See application file for complete search history.

(56) References Cited

U.S. PATENT DOCUMENTS

| | | | |
|---|---|---|---|
| 5,313,617 A | 5/1994 | Nakano et al. | |
| 5,940,849 A * | 8/1999 | Koyama | 711/4 |
| 6,651,137 B2 | 11/2003 | Baek et al. | |
| 7,039,657 B1 * | 5/2006 | Bish et al. | 707/203 |
| 2003/0105923 A1 | 6/2003 | Bak et al. | |
| 2003/0128454 A1 * | 7/2003 | Basham et al. | 360/69 |
| 2004/0181388 A1 * | 9/2004 | Yip et al. | 703/25 |
| 2005/0256999 A1 * | 11/2005 | Kishi et al. | 711/111 |

FOREIGN PATENT DOCUMENTS

| | | |
|---|---|---|
| CN | 1501268 | 11/2002 |
| JP | 62-163154 | 7/1987 |
| JP | 3-268128 | 11/1991 |
| JP | 9-26904 | 1/1997 |
| JP | 9-50353 | 2/1997 |
| JP | 10-254630 | 9/1998 |
| JP | 2000-76020 | 3/2000 |
| JP | 2001-84112 | 3/2001 |
| KR | 2001-0051535 | 6/2001 |
| KR | 2002-0058511 | 7/2002 |

OTHER PUBLICATIONS

Chinese Patent Office Action, mailed Dec. 29, 2006, and issued in corresponding Chinese Patent Application No. 200510065238.3.

(Continued)

*Primary Examiner*—Tuan V Thai
*Assistant Examiner*—Midys Rojas
(74) *Attorney, Agent, or Firm*—Staas & Halsey LLP

(57) ABSTRACT

A data management method is adapted to a hierarchical virtual storage system which virtually uses a library apparatus having a plurality of recording media as a portion of a hard disk apparatus. The data management method manages loading of the recording media to the library apparatus and unloading of the recording media from the library apparatus in a database in units of a set that is formed by a plurality of recording media, and forms a logical volume, which is a recording unit of a data file with respect to the library apparatus, by one or a plurality of recording media, and manages the logical volume in the database in correspondence with the set.

24 Claims, 6 Drawing Sheets

OTHER PUBLICATIONS

Korean Office Action, mailed Jul. 28, 2006, issued in corresponding Korean Patent Application No. 10-2005-0030605.

Japanese Office Action mailed on Jul. 7, 2009 for corresponding Japanese Patent Application 2004-367935.

* cited by examiner

DATA MANAGEMENT METHOD AND APPARATUS, HIERARCHICAL STORAGE APPARATUS AND COMPUTER-READABLE STORAGE MEDIUM

This application claims the benefit of a Japanese Patent Application No.2004-367935 filed Dec. 20, 2004, in the Japanese Patent Office, the disclosure of which is hereby incorporated by reference.

BACKGROUND OF THE INVENTION

1. Field of the Invention

The present invention generally relates to data management methods and apparatuses, hierarchical storage apparatuses and computer-readable storage media, and more particularly to a data management method and a data management apparatus for managing data in a library apparatus using recording media other than hard disks, such as magnetic tapes, and to a hierarchical storage apparatus which is hierarchically formed by a hard disk apparatus and a library apparatus and employs such a data management method, and to a computer-readable storage medium which stores a program for causing a computer to function as a data management apparatus.

2. Description of the Related Art

Conventionally, large-capacity information file (or storage) systems are mainly library apparatuses which use recording media such as magnetic tapes and optical disks. However, such a library apparatus require time to exchange information with a host computer in order to carry out read and write processes. For this reason, the library apparatus is not used as an information storage apparatus for on-line access use, but used mainly as a backup apparatus. On the other hand, a high-speed access can be made with respect to a hard disk apparatus, but the cost of the hard disk is high compared to that of a magnetic tape and the like. Consequently, it is difficult to realize an inexpensive large-capacity information file system by solely using the hard disks.

Hierarchical information file systems formed by a hard disk apparatus that is connected to a library apparatus using magnetic tapes have been proposed based on the so-called Information Lifecycle Management (ILM). However, such hierarchical information file systems are designed to automatically backup the information stored in the hard disks, and the user must be fully aware of the library apparatus which uses the magnetic tapes.

In addition, techniques have been proposed to efficiently manage the hierarchical information file system by a management software of the host computer, but the user still needs to be fully aware of the library apparatus which uses the magnetic tapes. Furthermore, there was an inconvenience in that the information access by the application program puts pressure on the network resources.

A data management system proposed in a Japanese Laid-Open Patent Application No.9-26904 copies data having a high frequency of use from a storage medium of the library apparatus to the hard disk in advance. If the requested data is not recorded in the hard disk, the requested data is not output directly from the library apparatus, but is output after being copied and recorded in the hard disk. Hence, the data request from each application program is processed separately from the library apparatus, and the data management system carries out a control as if all of the data are recorded in the hard disk. In this proposed data management system, the library apparatus is virtually used as a portion of the hard disk apparatus.

When virtually using the library apparatus as a portion of the hard disk apparatus, the user must manage each recording medium within the library apparatus, that is, manage each volume. In other words, since the recording media of the library apparatus are loaded and unloaded (or mounted and demounted), the use must always manage the volumes. However, when using the library apparatus, a multi-file volume may be employed in which a plurality of files are recorded in one volume or, a multi-volume file may be employed in which one file is recorded in a plurality of volumes.

Conventionally, when virtually using the library apparatus as a portion of the hard disk apparatus, the volumes must be managed by the user. For this reason, there were problems in that the user must carry out the troublesome operation of managing the volumes, and that the user must always be fully aware of the library apparatus.

SUMMARY OF THE INVENTION

Accordingly, it is a general object of the present invention to provide a novel and useful data management method and apparatus, hierarchical storage apparatus and computer-readable storage medium, in which the problems described above are suppressed.

Another and more specific object of the present invention is to provide a data management method, a data management apparatus, a hierarchical storage apparatus and a computer-readable storage medium, which do not require the user to be fully aware of a library apparatus when virtually using the library apparatus as a portion of a hard disk apparatus, and can automatically manage volumes in logical volumes that are recording units of data files.

Still another object of the present invention is to provide a data management method for a hierarchical virtual storage system which virtually uses a library apparatus having a plurality of recording media as a portion of a hard disk apparatus, comprising managing loading of the recording media to the library apparatus and unloading of the recording media from the library apparatus in a database in units of a set that is formed by a plurality of recording media; and forming a logical volume, which is a recording unit of a data file with respect to the library apparatus, by one or a plurality of recording media, and managing the logical volume in the database in correspondence with the set. According to the data management method of the present invention, it is possible to automatically manage logical volumes without having the user to be fully aware of the library apparatus.

A further object of the present invention is to provide a data management apparatus for a hierarchical virtual storage system which virtually uses a library apparatus having a plurality of recording media as a portion of a hard disk apparatus, comprising database; and a control part configured to manage loading of the recording media to the library apparatus and unloading of the recording media from the library apparatus in the database in units of a set that is formed by a plurality of recording media, and to form a logical volume, which is a recording unit of a data file with respect to the library apparatus, by one or a plurality of recording media, and manage the logical volume in the database in correspondence with the set. According to the data management apparatus of the present invention, it is possible to automatically manage logical volumes without having the user to be fully aware of the library apparatus.

Another object of the present invention is to provide a hierarchical storage apparatus comprising a hard disk apparatus; a library apparatus, loadable with a plurality of recording media, and virtually used as a portion of the hard disk; and a hierarchical control server including a database and a control part, the control part managing loading of the recording media to the library apparatus and unloading of the recording media from the library apparatus in the database in units of a set that is formed by a plurality of recording media, and forming a logical volume, which is a recording unit of a data file with respect to the library apparatus, by one or a plurality of recording media, and managing the logical volume in the database in correspondence with the set. According to the hierarchical storage apparatus of the present invention, it is possible to automatically manage logical volumes without having the user to be fully aware of the library apparatus.

Still another object of the present invention is to provide a computer-readable storage medium which stores a program for causing a computer to manage data in a hierarchical virtual storage system which virtually uses a library apparatus having a plurality of recording media as a portion of a hard disk apparatus, the program comprising a procedure causing the computer to manage loading of the recording media to the library apparatus and unloading of the recording media from the library apparatus in a database in units of a set that is formed by a plurality of recording media; and a procedure causing the computer to form a logical volume, which is a recording unit of a data file with respect to the library apparatus, by one or a plurality of recording media, and to manage the logical volume in the database in correspondence with the set. According to the computer-readable storage medium of the present invention, it is possible to automatically manage logical volumes without having the user to be fully aware of the library apparatus.

Other objects and further features of the present invention will be apparent from the following detailed description when read in conjunction with the accompanying drawings.

DESCRIPTION OF THE PREFERRED EMBODIMENTS

Figure 1:
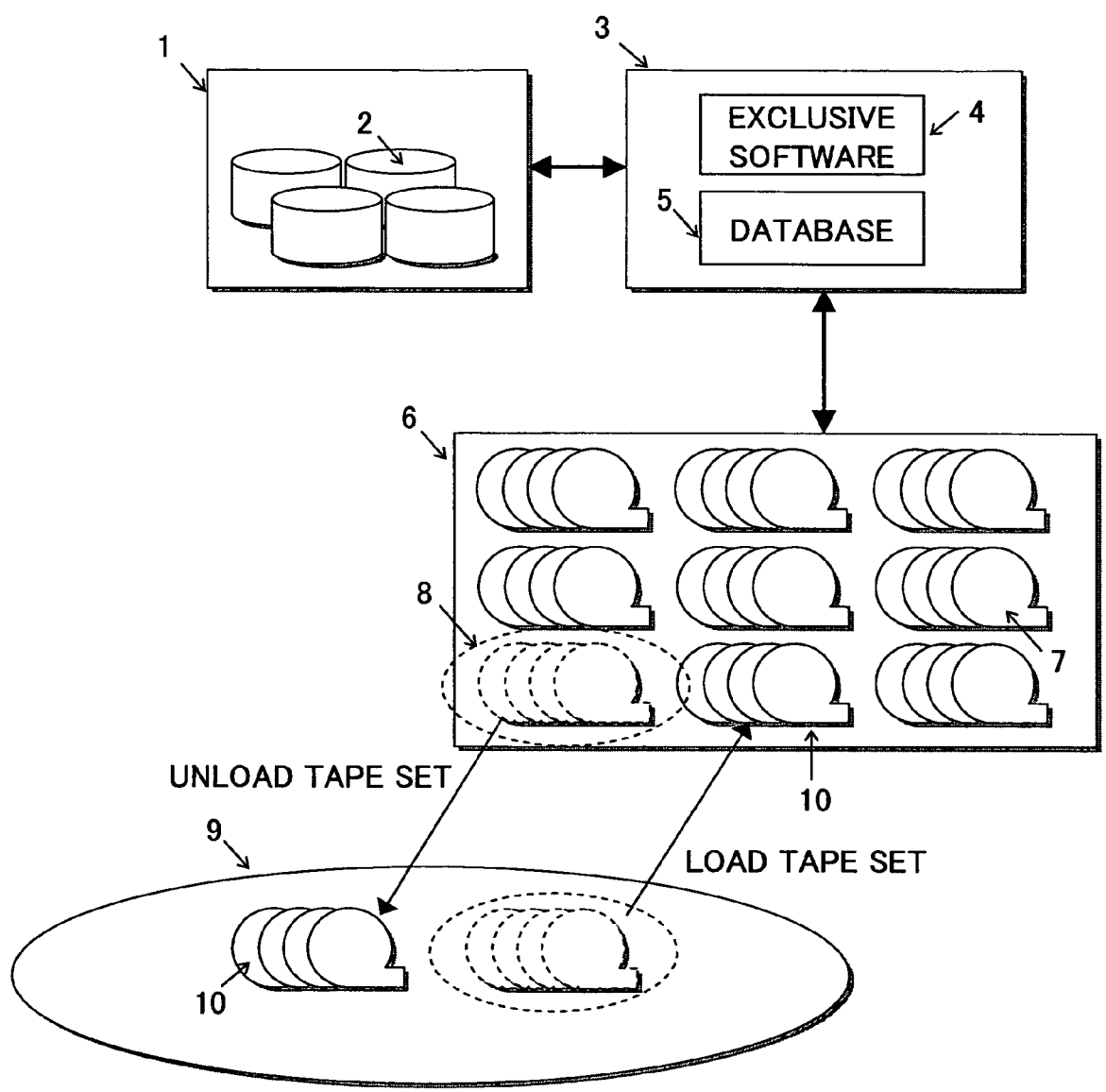
FIG. 1 is a diagram showing an embodiment of a hierarchical storage apparatus according to the present invention.

A description will be given of embodiments of a data management method, a data management apparatus and a hierarchical storage apparatus according to the present invention, by referring to the drawings.

FIG. 1 is a diagram showing an embodiment of a hierarchical storage apparatus according to the present invention. This embodiment of the hierarchical storage apparatus employs an embodiment of the data management method according to the present invention and an embodiment of the data management apparatus according to the present invention. In this embodiment, the present invention is applied to a hierarchical virtual storage system which virtually uses a library apparatus as a portion of a hard disk apparatus. In addition, it is assumed for the sake of convenience that the library apparatus uses magnetic tapes in this embodiment, but recording media used in the library apparatus are not limited to the magnetic tapes and any suitable recording media other than hard disks, such as optical disks, may be used in the library apparatus.

The hierarchical storage apparatus includes a hard disk apparatus (or hard disk drive) 1, a hierarchical control server 3 and a library apparatus 6 which are connected as shown in FIG. 1. The hard disk apparatus 1 has a known structure including a plurality of hard disks 2. In this embodiment, the hard disk apparatus 1 has a Redundant Arrays of Independent Disks (RAID) structure. The hierarchical control server 3 forms this embodiment of the data management apparatus. The hierarchical control server 3 is formed by a general-purpose computer having a known structure including a processor and a storage part, and has an exclusive software 4 and a database 5. The library apparatus 6 has a known structure including a plurality of magnetic tape cartridges (or cassettes) 7 and a tape management function that manages the magnetic tape cartridges 7 loaded (or mounted) into the library apparatus 6 and the magnetic tape cartridges 7 unloaded (or demounted) from the library apparatus 6. In this embodiment, one logical volume 8, which is a recording unit of a data file with respect to the library apparatus 6, is formed by a plurality of magnetic tape cartridges 7 as indicated by a dotted line. The logical volume 8 changes dynamically as data are additionally written to the corresponding data file and data are deleted from the corresponding data file.

The magnetic tape cartridge 7 that is loaded into the library apparatus 6 and/or the magnetic tape cartridge 7 that is unloaded from the library apparatus 6 can be stored in a tape storage 9. FIG. 1 shows a case where a tape set 10 unloaded from the library apparatus 6 is ejected to the tape storage 9, and another tape set 10 stored in the tape storage 9 is loaded into the library apparatus 6. In this embodiment, the magnetic tape cartridges 7 that are allocated to the logical volume 8 are loaded into the library apparatus 8 in units of the tape set 10, and are unloaded from the library apparatus 6 in units of the tape set 10. The tape set 10 is formed by one or a plurality of magnetic tape cartridges 7 forming one logical volume 8. Those magnetic tape cartridges (new, vacant and the like) 7 that are not allocated to the logical volume 8 may be loaded into and unloaded from the library apparatus 6 in units of the magnetic tape cartridge 7.

FIG. 1 shows a case where one logical volume 8 is formed by one tape set 10 that is made up of four magnetic tape cartridges 7, for example. Although the logical volume 8 and the tape set 10 have a 1:1 correspondence in this embodiment, the logical volume 8 and the tape set 10 may have a 1:2 correspondence, for example, when a mirroring of the tape set 10 is employed.

The exclusive software 4 of the hierarchical control server 3 moves the data stored within the library apparatus 6 to the hard disk apparatus 1 if necessary, so that a host apparatus (not shown) can access the data within the library apparatus 6 by making a read access to the hard disk apparatus 1. The host apparatus is connected to the hard disk apparatus 1. The exclusive software 4 of the hierarchical control server 3 may move the data to the library apparatus 6 after storing the data in the hard disk apparatus 1 in response to a write access from the host apparatus, so that the host apparatus can write the data into the library apparatus 6 by making the write access to the hard disk apparatus 1.

The database 5 of the hierarchical control server 3 manages information required to cope with the access from the host apparatus by being notified of this information by a tape management function of the library apparatus 6. In this embodiment, the database 5 manages logical volume information that is managed in units of logical volumes, media information that is managed in units of magnetic tape cartridges 7, and library information that is managed in units of library apparatuses 6. The logical volume information includes a logical volume ID which is a consecutive number for management (unique value) that is assigned to each logical volume when newly creating a logical volume, a logical volume number that takes a value of the logical volume number immediately prior to the unloading the logical volume when unloading the magnetic tape cartridge 7 of the logical volume, a logical volume capacity indicating a capacity of the logical volume, a date and time of creation of the logical volume, and storage information including a flag that indicates whether or not the logical volume is unloaded from the library apparatus 6 and the magnetic tape cartridge 7 of the logical volume is in a stored state. The media information includes a media ID which is a consecutive number for management (unique value) that is assigned to each magnetic tape cartridge 7 when newly loading the magnetic tape cartridge 7 into the library apparatus 6, label information indicating a label name of a label adhered to the magnetic tape cartridge 7, a stored library ID (unloading library ID at the time of unloading) indicating an ID of the library apparatus 6 in which the magnetic tape cartridge 7 is loaded, load information including a flag that indicates whether or not the magnetic tape cartridge 7 is loaded into the library apparatus 6, logical volume allocation information including a flag that indicates whether or not the magnetic tape cartridge 7 is used as the logical volume 8, a logical volume ID (only when used as the logical volume 8) that is similar to the logical volume ID described above, a logical volume constituent number (only when used as the logical volume 8) that indicates a constituent number of the magnetic tape cartridge 7 within the tape set 10 forming the logical volume 8, and a loaded date and time when each magnetic tape cartridge 7 is newly loaded into the library apparatus 6. The library information includes a library ID which is a consecutive number for management (unique value) that is assigned to the library apparatus 6 when registering the library apparatus 6 with respect to the hierarchical storage apparatus, and a library apparatus name including an apparatus name (vendor name, product name, serial number and the like) of the library apparatus 6.

Accordingly, the database 5 manages the logical volumes 8 in correspondence with the tape sets 10.

Figure 2:
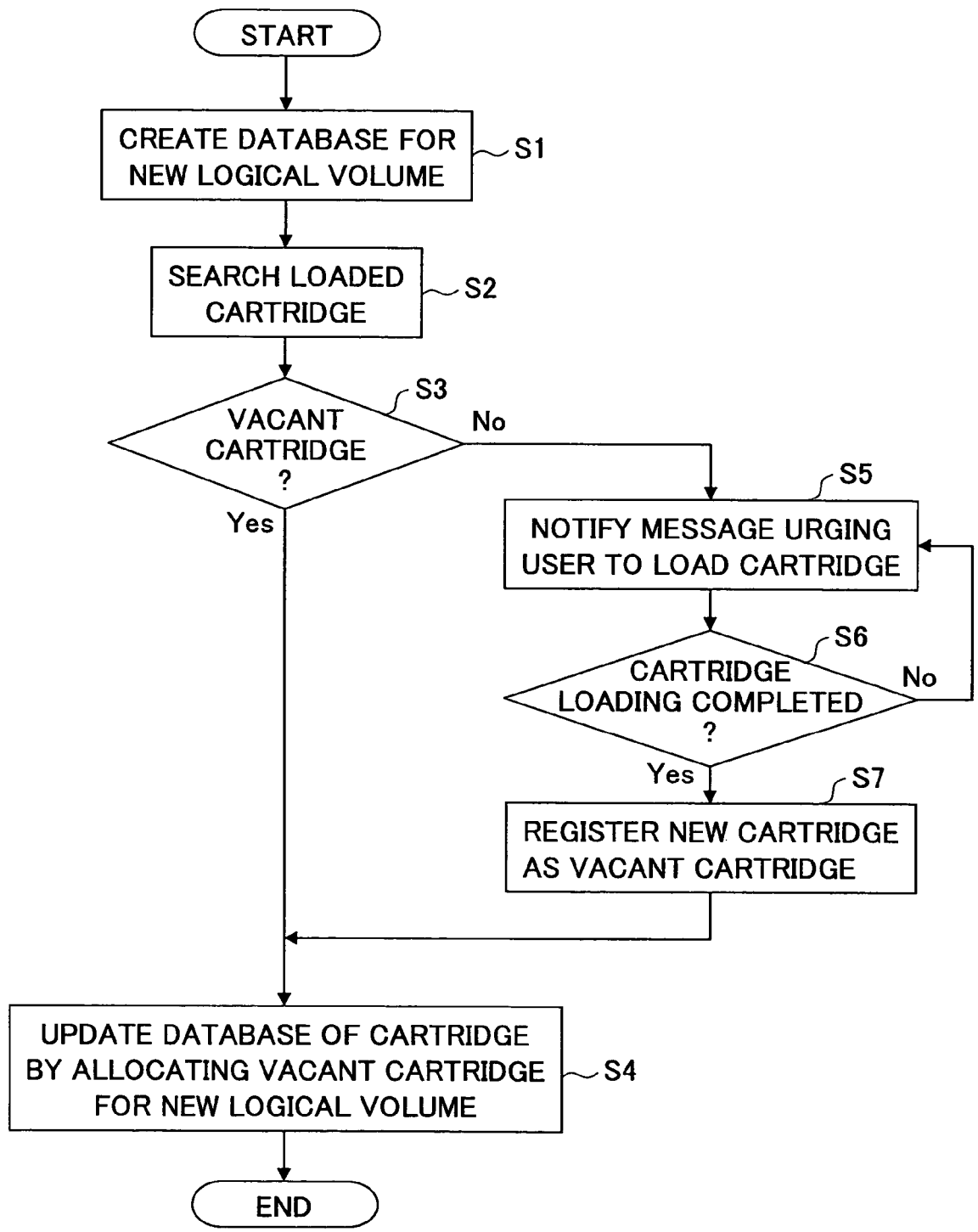
FIG. 2 is a flow chart for explaining an operation of a hierarchical control server when forming logical volumes.

FIG. 2 is a flow chart for explaining an operation of the hierarchical control server 3 when forming logical volumes. The process shown in FIG. 2 is carried out by the exclusive software 4. When a new logical volume forming operation is started, a step S1 creates a database for new logical volume within the database 5. The database for new logical volume is created by newly allocating a logical volume ID, newly allocating a logical volume number, setting a logical volume capacity to a value specified by the user, setting the date and time of the creation to the present date and time, and setting the flag of the storage information to an OFF (reset) state. A step S2 searches for the magnetic tape cartridges 7 that are loaded in the library apparatus 6 by referring to the database 5. A step S3 decides whether or not a vacant magnetic tape cartridge 7 that may be allocated to the logical volume exists within the magnetic tape cartridges 7 that are loaded in the library apparatus 6. The vacant magnetic tape cartridge 7 may be a blank magnetic tape cartridge 7. If the decision result in the step S3 is YES, a step S4 allocates the vacant magnetic tape cartridge 7 for the new logical volume, and updates information within the database 5 related to this vacant magnetic tape cartridge 7. More particularly, the step S4 updates the flag of the logical volume allocation information to an ON (set) state, sets the logical volume ID, and sets the logical volume constituent number to "1". The process ends after the step S4.

On the other hand, if the decision result in the step S3 is NO, a step S5 notifies a message to urge the user to load a new tape set 10 into the library apparatus 6. This message is displayed on a display part (not shown) of the hierarchical control server 3 and/or the library apparatus 6 and/or the host apparatus. Of course, the method of notifying this message is not limited to the display, and the message may be notified by voice and/or display. A step S6 decides whether or not the loading of the new tape set 10 into the library apparatus 6 is completed, and the process returns to the step S5 if the decision result in the step S6 is NO. If the decision result in the step S6 is YES, a step S7 registers, in the database 5, the magnetic tape cartridges 7 of the newly loaded tape set 10 as vacant magnetic tape cartridges 7, and the process advances to the step S4.

Figure 3:
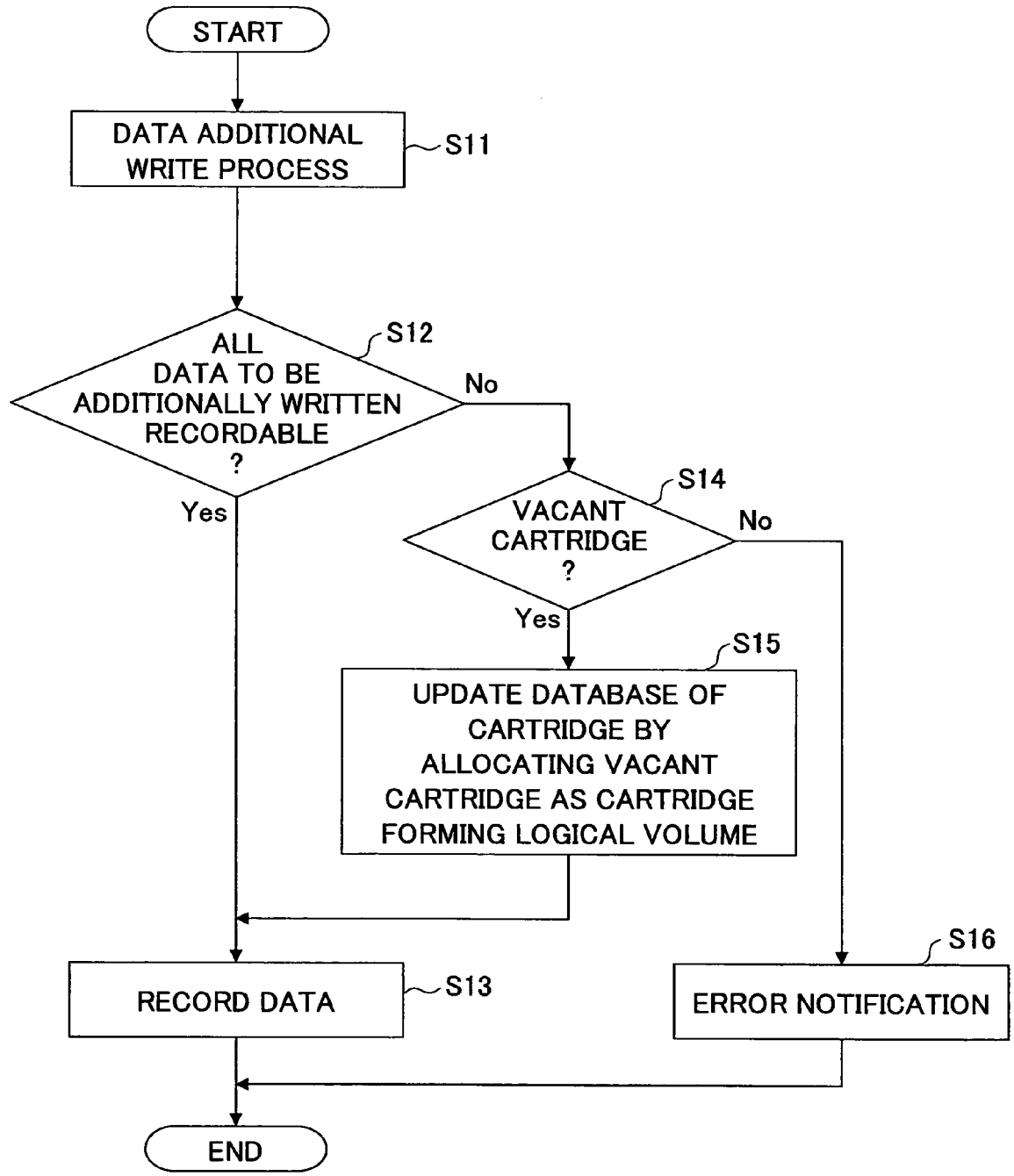
FIG. 3 is a flow chart for explaining an operation of the hierarchical control server when additionally writing to the logical volumes.

FIG. 3 is a flow chart for explaining an operation of the hierarchical control server 3 when additionally writing to the logical volumes. The process shown in FIG. 3 is carried out by the exclusive software 4. The process shown in FIG. 3 is started when a data write to an allocated region within the hard disk apparatus 1 (write to one data file) is completed and this completion is notified to the host apparatus, and a data write to the corresponding logical volume 8 of the library apparatus 6 is thereafter carried out at an arbitrary timing. A step S11 starts a data additionally write process with respect to the tape set 10 forming the logical volume 8. A step S12 decides whether or not all of the data to be additionally written can be written into the tape set 10 forming the logical volume 8. If the decision result in the step S12 is YES, a step S13 writes all of the data to be additionally written into the magnetic tape cartridges 7 of the tape set 10, and the process ends when the data additionally write process is completed.

On the other hand, if the decision result in the step S12 is NO, a step S14 decides whether or not a vacant tape set 10 exists in the library apparatus 6. If the decision result in the step S14 is NO, the data write cannot be made to the logical volume 8, and a step S16 notifies a message indicating a data write error with respect to the library apparatus 6 (that is, indicating that the data additionally write process to the tape set 10 failed), and the process ends. This message is displayed on the display part (not shown) of the hierarchical control server 3 and/or the library apparatus 6 and/or the host apparatus. Of course, the method of notifying this message is not limited to the display, and the message may be notified by voice and/or display.

If the decision result in the step S14 is YES, a step S15 allocates the vacant magnetic tape cartridges 7 as the tape set 10 forming the logical volume 8, and updates the information within the database 5 related to each magnetic tape cartridge 7 within the tape set 10. More particularly, the step S15 updates the flag of the logical volume allocation information related to each magnetic tape cartridge 7 newly allocated to the logical volume 8 to the ON (set) state, sets the logical volume ID, and sets a next number to the logical volume constituent number. The process advances to the step S13 after the step S15.

Figure 4:
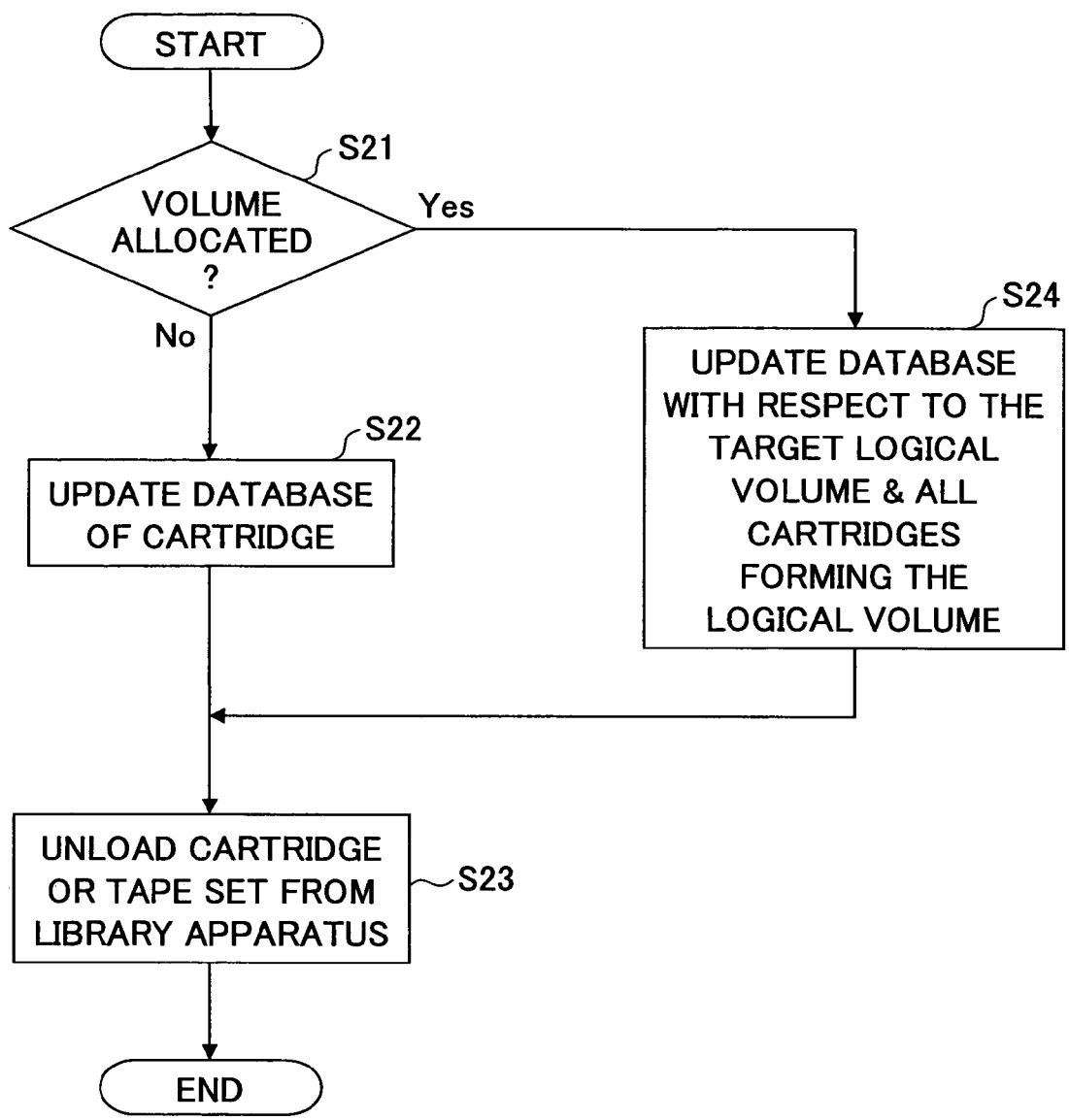
FIG. 4 is a flow chart for explaining an operation of the hierarchical control server when unloading a magnetic tape cartridge.

FIG. 4 is a flow chart for explaining an operation of the hierarchical control server 3 when unloading the magnetic tape cartridge 7. The process shown in FIG. 4 is carried out by the exclusive software 4. The process shown in FIG. 4 is started when an unload request requesting the unloading of the selected magnetic tape cartridges 7 (or tape set 10) is received from the tape management function of the library apparatus 6. A step S21 decides whether or not the logical volume 8 is allocated with respect to the selected magnetic tape cartridges 7, based on the information related to the selected magnetic tape cartridges 7 that is included in the unload request. The process advances to a step S22 if the decision result in the step S21 is NO, and the process advances to a step S24 if the decision result in the step S21 is YES. The information related to the selected tape set 10 may be input by the user from the host apparatus or, automatically input from the library apparatus 6. For example, the information related to the selected tape set 10 may be input automatically from the library apparatus 6 by reading information of a label adhered to the tape set 10 and/or each magnetic tape cartridge 7 of the tape set 10 by a reading means (not shown) such as a bar code reader provided in the library apparatus 6.

The step S22 updates the information within the database 5 related to the selected magnetic tape cartridges 7. More particularly, the step S22 updates the flag of the load information related to the selected magnetic tape cartridges 7 to the OFF (reset) state. A step S23 confirms the unloading of the selected magnetic tape cartridges 7 from the library apparatus 6, based on a notification from the tape management function of the library apparatus 6, and the process ends. On the other hand, if the decision result in the step S21 is YES, the step S24 updates the information within the database 5 with respect to all of the magnetic tape cartridges 7 of the tape set 10 forming the logical volume 8 to which the selected magnetic tape cartridges 7 are allocated, and the process ends. More particularly, the step S24 updates the flag of the storage information within the database 5 to the ON (set) state and the flag of the load information within the database 5 to the OFF (reset) state, with respect to each of the magnetic tape cartridges 7 of the tape set 10 forming the logical volume 8 to which the selected magnetic tape cartridges 7 are allocated. After the step S24, the process advances to the step S23, but in this case, the step S23 confirms the unloading of the tape set 10 to which the selected magnetic tape cartridges 7 belong from the library apparatus 6 (that is, the unloading of all of the magnetic tape cartridges 7 forming the tape set 10), based on a notification from the tape management function of the library apparatus 6, and the process ends.

Figure 5:
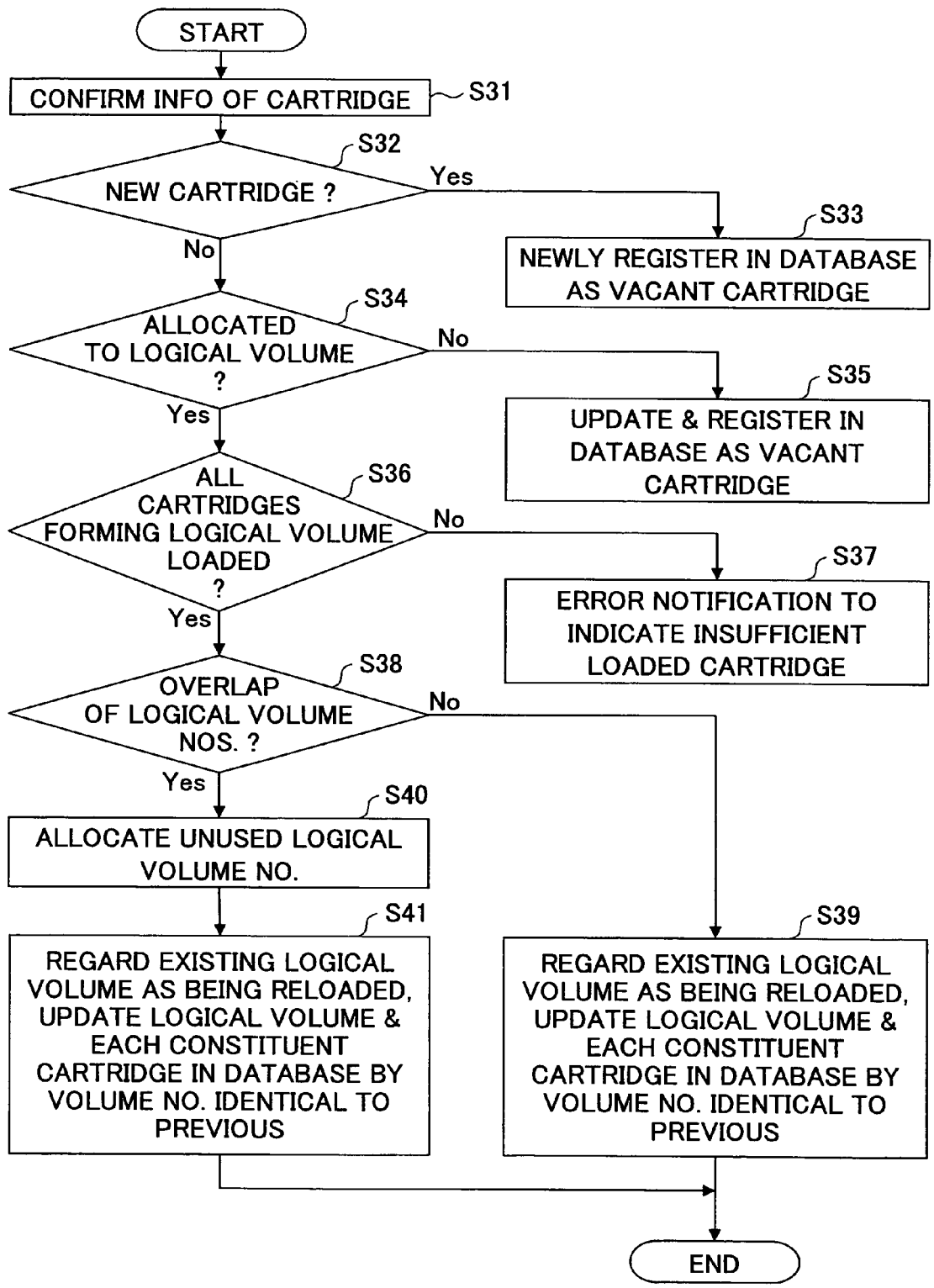
FIG. 5 is a flow chart for explaining an operation of the hierarchical control server when loading the magnetic tape cartridge.

FIG. 5 is a flow chart for explaining an operation of the hierarchical control server 3 when loading the magnetic tape cartridge 7. The process shown in FIG. 5 is carried out by the exclusive software 4. The process shown in FIG. 5 is started when a load request requesting loading of the selected magnetic tape cartridges 7 (or tape set 10) is received from the tape management function of the library apparatus 6. A step S31 confirms the information related to the selected magnetic tape cartridges 7 from the information included in the load request and related to the selected magnetic tape cartridges 7. A step S32 decides whether or not the selected magnetic tape cartridges 7 are new magnetic tape cartridges 7 that have never been loaded in the library apparatus 6 in the past. The information related to the selected magnetic tape cartridges 7 may be input by the user from the host apparatus or, automatically input from the library apparatus 6. For example, the information related to the selected magnetic tape cartridges 7 may be input automatically from the library apparatus 6 by reading the information of the label adhered to the tape set 10 and/or each magnetic tape cartridge 7 of the tape set 10 by the reading means (not shown) such as the bar code reader provided in the library apparatus 6. If the decision result in the step S32 is YES, a step S33 newly registers the selected magnetic tape cartridges 7 in the database 5 as vacant magnetic tape cartridges 7, and the process ends. More particularly, the step S33 makes a new registration with respect to the selected magnetic cartridges 7 by newly allocating a media ID, setting the flag of the load information to the ON (set) state, setting the flag of the logical volume allocation information to the OFF (reset) state, and setting the stored library ID.

If the decision result in the step S32 is NO, a step S34 decides whether or not the logical volume is allocated to the selected magnetic tape cartridges 7. If the decision result in the step S34 is NO, a step S35 updates the information within the database 5 by regarding the selected magnetic tape cartridges 7 as vacant magnetic tape cartridges 7, and the process ends. More particularly, the step S35 updates the flag of the load information within the database 5 to the ON (set) state and updates the stored library ID, with respect to the selected magnetic tape cartridges 7.

If the decision result in the step S34 is YES, a step S36 decides whether or not all of the magnetic tape cartridges 7 of the tape set 10 forming the logical volume 8 to which the selected magnetic tape cartridges are allocated are loaded in the library apparatus 6. If the decision result in the step S36 is NO, a step S37 notifies an error information indicating that not all of the magnetic tape cartridges 7 of the tape set 10 forming the logical volume 8 to which the selected magnetic tape cartridges 7 are allocated are loaded in the library apparatus 6, and the process ends. This message is displayed on the display part (not shown) of the hierarchical control server 3 and/or the library apparatus 6 and/or the host apparatus. Of course, the method of notifying this message is not limited to the display, and the message may be notified by voice and/or display.

If the decision result in the step S36 is YES, a step S38 decides whether or not an overlap exists between the logical volume numbers of the logical volume 8 to which the selected magnetic tape cartridges 7 are allocated and another logical volumes 8 which are managed in the database 5. More particularly, the step S38 decides whether or not an overlap exists between the logical volume number that is assigned in the past with respect to the logical volume 8 to which the selected magnetic tape cartridges 7 are allocated, and the logical volume numbers of all of the logical volumes 8 that are presently managed in the database 5. If the decision result in the step S38 is NO, a step S39 judges that the magnetic tape cartridges 7 belonging to an existing logical volume 8 has been reloaded into the library apparatus 6, updates the information within the database 5 related to the logical volume 8 to which the selected magnetic tape cartridges 7 are allocated, using the same logical volume number as the previous logical volume number, and related to each of the magnetic tape cartridges 7 of the tape set 10 forming this logical volume 8, and the process ends. More particularly, the step S39 updates the flag of the load information to the ON (set) state, updates the stored library ID, and updates the flag of the storage information to the OFF (reset) state, within the database 5, with respect to the logical volume 8 to which the selected magnetic tape cartridges 7 are allocated, using the same logical volume number as the previous logical volume number, and with respect to each of the magnetic tape cartridges 7 of the tape set 10 forming this logical volume 8.

On the other hand, if the decision result in the step S38 is YES, a step S40 allocates an unused logical volume number with respect to the logical volume 8 to which the selected magnetic tape cartridges 7 are allocated, and the process advances to a step S41. The step S41 judges that the magnetic tape cartridges 7 allocated to the existing logical volume 8 have been reloaded, and updates the information within the database 5 related to the logical volume 8 to which the selected magnetic tape cartridges 7 are allocated and each magnetic tape cartridge 7 of the tape set 10 forming this logical volume 8, by the newly allocated logical volume number, and the process ends. More particularly, the step S41 updates the flag of the load information to the ON (set) state, updates the stored library ID, updates the flag of the storage information and updates the logical volume number, within the database 5, with respect to the logical volume 8 to which the selected magnetic tape cartridges 7 are allocated and each magnetic tape cartridge of the tape set 10 forming this logical volume 8, by the newly allocated logical volume number.

Figure 6:
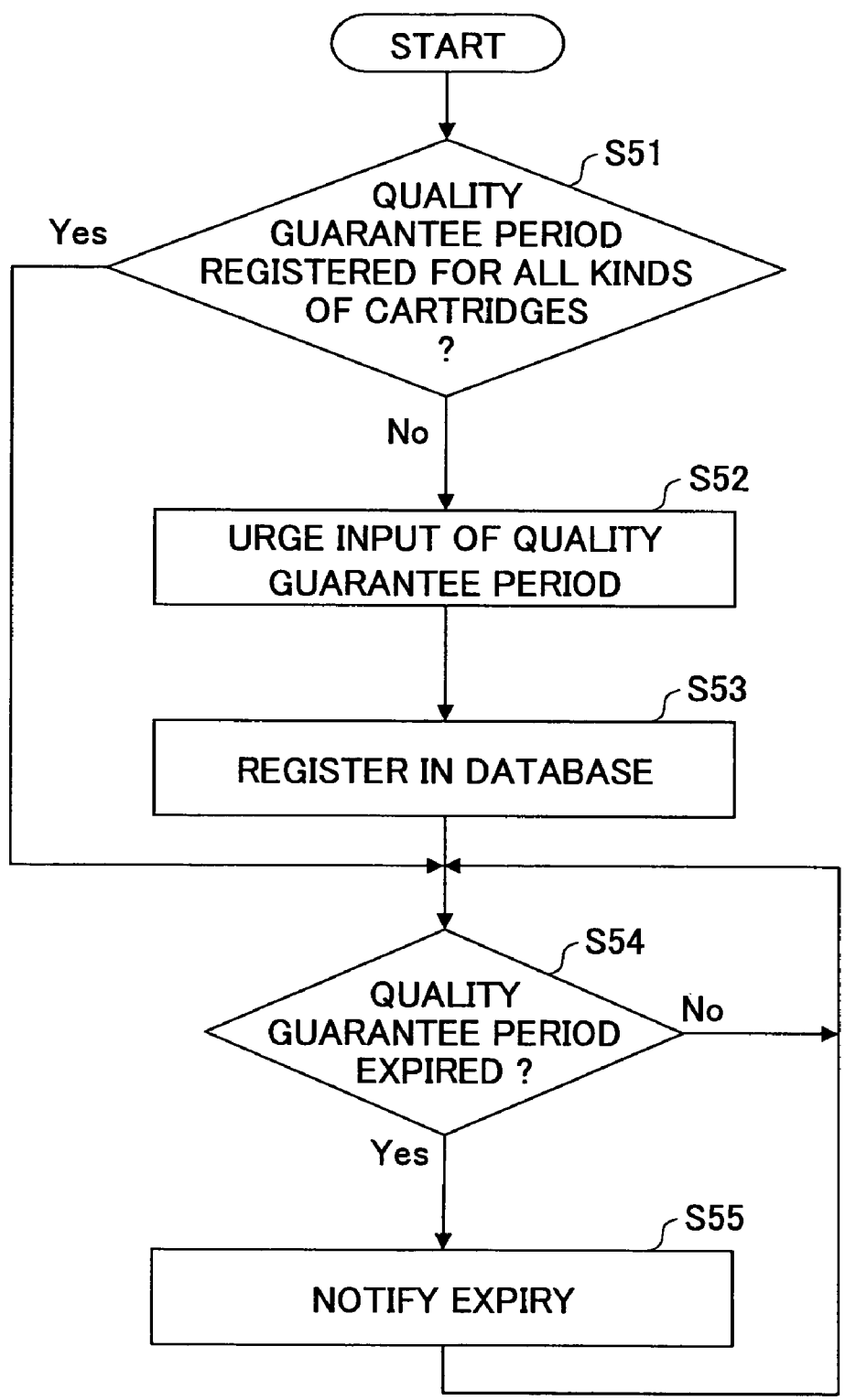
FIG. 6 is a flow chart for explaining an alarm notifying operation of the hierarchical control server depending on a quality guarantee period of the magnetic tape cartridge.

FIG. 6 is a flow chart for explaining an alarm notifying operation of the hierarchical control server 3 depending on a quality guarantee period of the magnetic tape cartridge 7. The process shown in FIG. 6 is carried out by the exclusive software 4. The process shown in FIG. 6 is started in an initial state where all of the magnetic tape cartridges 7 are first loaded into the library apparatus 6, and when the magnetic tape cartridges 7 are thereafter loaded into the library apparatus 6. It is assumed for the sake of convenience that quality guarantee periods of various kinds of magnetic tape cartridges 7 that are loaded in the library apparatus 6 are registered in the database 5.

In FIG. 6, a step S51 decides whether or not the quality guarantee periods with respect to all of the kinds of magnetic tape cartridges 7 that are loaded in the library apparatus 6 are registered in the database 5, based on the media information related to the magnetic tape cartridges 7 that are loaded in the library apparatus 6 and is notified by the tape management function of the library apparatus 6. More particularly, the step S51 recognizes the kind of each loaded magnetic tape cartridge 7 from the label information within the media information, and decides whether or not the quality guarantee period corresponding to each recognized kind of magnetic tape cartridge 7 is registered in the database 5. The process advances to a step S54 which will be described later if the decision result in the step S51 is YES.

On the other hand, if the decision result in the step S51 is NO, a step S52 notifies a message urging the user to input the quality guarantee period of the kind of magnetic tape cartridge 7 that is not registered in the database 5. This message is displayed on the display part (not shown) of the hierarchical control server 3 and/or the library apparatus 6 and/or the host apparatus. Of course, the method of notifying this message is not limited to the display, and the message may be notified by voice and/or display. A step S53 registers the quality guarantee period that is input by the user within the database 5, and the process advances to the step S54. The quality guarantee period may be input from an input part (not shown) of the hierarchical control server 3 or the library apparatus 6 or the host apparatus.

The step S54 reads from the database 5 the quality guarantee period for each kind of magnetic tape cartridge 7 that is recognized from the label information within the media information, and decides whether or not the period from the loaded date and time within the media information to the present date and time exceeds the quality guarantee period. In other words, the step S54 decides whether or not the quality guarantee period is exceeded (or expired). The step S54 is repeated if the decision result in the step S54 is NO. When the decision result in the step S54 becomes YES, a step S55 notifies to the user a message indicating the existence of the loaded magnetic tape cartridge 7 that has exceeded the quality guarantee period thereof, together with the label name and the like, and the process returns to the step S54. This message is also displayed on the display part (not shown) of the hierarchical control server 3 and/or the library apparatus 6 and/or the host apparatus. Of course, the method of notifying this message is not limited to the display, and the message may be notified by voice and/or display.

Therefore, according to this embodiment, the exclusive software 4 of the hierarchical control server 3 manages the logical volume information and the media information of each magnetic tape cartridge 7 of the tape set 10 in the database 5, together with the library information of the library apparatus 6. In addition, the database 5 manages the logical volume information in units of logical volumes 8, manages the media information in units of magnetic tape cartridges 7, and manages the library information in units of library apparatuses 6. The unloading of the magnetic tape cartridges 7 from the library apparatus 6 can only be made in units of the tape set 10 forming the logical volume, in the case of the magnetic tape cartridges 7 allocated to the logical volume 8. The loading or reloading of the magnetic tape cartridges 7 allocated to the logical volume 8 is also made in units of the tape set 10. If a magnetic tape cartridge 7 (or tape set 10) allocated to the logical volume 8 is not loaded in the library apparatus for some reason, a message is notified to the user to indicate that there is a missing magnetic tape cartridge 7 (or tape set 10) which is allocated to the logical volume 8 but is not yet loaded in the library apparatus 6.

In a state where the logical volume 8 formed by the tape set 10 (or magnetic tape cartridges 7) unloaded from the library apparatus 6 is managed, it is possible to newly create a logical volume number which is identical to that of this logical volume 8. When the unloaded tape set 10 is reloaded into the library apparatus 6 in this state, another logical volume number is newly allocated with respect to the logical volume 8 that is formed by the reloaded tape set 10, and thus, both the two logical volumes 8 become usable. When the tape set 10 that is unloaded from the library apparatus 6 is reloaded into another library apparatus having the same functions as the library apparatus 6, it is possible to read the logical volume information written in the tape set 10 (each magnetic tape cartridge 7) and form a logical volume 8 similar to that before the unloading in this other library apparatus and newly register the logical volume 8 in a database within a corresponding hierarchical control server. Further, the data within the logical volume 8 can be accessed in a hierarchical storage apparatus including this other library apparatus in a manner similar to that of the hierarchical storage apparatus shown in FIG. 1.

Moreover, the database 5 is recorded with the date and time of creation logical volume when the logical volume 8 formed by the magnetic tape cartridges 7 of the tape set 10 is generated. Hence, it is possible to notify an alarm message urging or instructing placement of each magnetic tape cartridge 7 before the quality guarantee period thereof is exceeded, including the tape set 10 (or magnetic tape cartridges 7) unloaded from the library apparatus 6.

Accordingly, the hierarchical storage apparatus is provided with a mechanism for managing the tape set 10 (or magnetic tape cartridges 7) in units of the logical volume 8, including the tape set 10 (or magnetic tape cartridges 7) unloaded from the library apparatus 6. For this reason, it is possible to easily reconstruct the logical volume 8 when the tape set 10 is reloaded into the library apparatus 6, and further, it is possible to form a logical volume 8 greater than or equal to the capacity of the library apparatus 6. In addition, by providing in the hierarchical storage apparatus a mechanism for notifying an alarm message to the user before the quality guarantee period of the magnetic tape cartridge 7 is exceeded, it is possible to prevent a failure from being generated due to deterioration of the magnetic tape cartridge 7 caused by aging. Moreover, it is possible to reduce the time and cost required for the user to manage the magnetic tape cartridges 7. Since the data capacity to be stored in the library apparatus 6 is expected to increase considerably and the number of magnetic tape cartridges 7 to be managed is also expected to make a corresponding increase, it is possible to form a large-capacity data management apparatus at a low cost according to this embodiment.

The present invention also relates to a program (corresponding to the exclusive software 4) for causing a processor, that is, a computer forming the hierarchical control server 3 to manage the data stored in the library apparatus 6 by the data management method, and to a computer-readable storage medium which stores such a program. In this case, the computer-readable storage medium may be formed by any suitable recording media including magnetic recording media optical recording media, magneto-optical recording media and semiconductor memory devices.

The present invention is also applicable to a hierarchical virtual storage system which virtually uses a library apparatus as a portion of a hard disk apparatus, and the library apparatus may use recording media that are inexpensive and/or slow in access speed compared to hard disks, such as magnetic tapes and optical disks.

Further, the present invention is not limited to these embodiments, but various variations and modifications may be made without departing from the scope of the present invention.

What is claimed is:

1. A data management method for a hierarchical virtual storage system which virtually uses a library apparatus having a plurality of recording media as a portion of a hard disk apparatus, comprising:
    managing loading of the recording media to the library apparatus and unloading of the recording media from the library apparatus in a database in units of a set that is formed by a plurality of recording media; and
    forming a logical volume, which is a recording unit of a data file with respect to the library apparatus, by a plurality of recording media, and managing the logical volume in the database in correspondence with the set,
    wherein information managed in the database includes logical volume information that is managed in units of the logical volume, media information that is managed in units of the recording medium, and library information that is managed in units of the library apparatus,
    wherein:
    the logical volume information includes a logical volume ID which is a consecutive number for management that is assigned to each logical volume when newly creating a logical volume, a logical volume number that takes a value of the logical volume number immediately prior to the unloading the logical volume when unloading a recording medium of the logical volume, a logical volume capacity indicating a capacity of the logical volume, a date and time of creation of the logical volume, and storage information including a flag that indicates whether or not the logical volume is unloaded from the library apparatus and the recording medium of the logical volume is in a stored state;
    the media information includes a media ID which is a consecutive number for management that is assigned to each recording medium when newly loading the recording medium into the library apparatus, label information indicating a label name of a label adhered to the recording medium, a stored library ID indicating an ID of the library apparatus in which the recording medium is loaded, load information including a flag that indicates whether or not the recording medium is loaded into the library apparatus, logical volume allocation information including a flag that indicates whether or not the recording medium is used as the logical volume, a logical volume ID which is a consecutive number for management that is assigned to each logical volume when newly creating a logical volume, a logical volume constituent number that indicates a constituent number of the recording medium within the set forming the logical volume, and a loaded date and time when each recording medium is newly loaded into the library apparatus; and
    the library information includes a library ID which is a consecutive number for management that is assigned to the library apparatus when registering the library apparatus with respect to the hierarchical virtual storage system, and a library apparatus name including an apparatus name of the library apparatus.

2. The data management method as claimed in claim 1, comprising, when forming a new logical volume:
    judging existence of a vacant recording medium within the library apparatus from the media information;
    notifying a message urging a new recording medium to be loaded into the library apparatus if no vacant recording medium exists;
    registering the vacant recording medium in the database depending on the loading of the new recording medium into the library apparatus; and
    updating the database by allocating the vacant recording medium to the new logical volume when the vacant recording medium exists or the vacant recording medium is registered in the database depending on the loading of the new recording medium.

3. The data management method as claimed in claim 1, comprising, when additionally writing to an existing logical volume:
    judging whether or not all data to be additionally written are recordable in the recording media forming the existing logical volume;
    updating the database by allocating a vacant recording medium to the existing logical volume if the vacant recording medium is loaded in the library apparatus, in a case where not all the data to be additionally written are recordable; and
    recording all the data to be additionally written in the vacant recording medium, in a case where all the data to be additionally written are recordable or, the database is updated by allocating the vacant recording medium to the existing logical volume.

4. The data management method as claimed in claim 1, comprising:
    updating the logical volume information and the media information within the database depending on whether or not a recording medium to be unloaded from the library apparatus is allocated to an existing logical volume, when unloading the recording medium from the library apparatus.

5. The data management method as claimed in claim 1, comprising, when loading the recording medium into the library apparatus:
    updating the media information within the database if the recording medium to be loaded is a new recording medium;
    registering the recording medium to be loaded as a vacant recording medium in the database if the recording medium is not a new recording medium and the recording medium is not allocated to an existing logical volume; and updating the logical volume information and the media information within the database if the recording medium to be loaded is not a new recording medium and the recording medium is allocated to the existing logical volume.

6. The data management method as claimed in claim 1, comprising:

updating the logical volume information and the media information within the database by assigning an unused logical volume number to an existing logical volume when updating the logical volume information and the media information within the database, if an overlap exists between a logical volume number that was assigned to the existing logical volume in the past and logical volume numbers presently managed in the database.

7. The data management method as claimed in claim 6, comprising:

managing a quality guarantee period of each kind of recording medium; and notifying a message indicating an expiry of the quality guarantee period for a recording medium when a period from a loaded date and time thereof to a present date and time exceeds the quality guarantee period, based on the media information including the loaded date and time and the kind of each recording medium loaded in the library apparatus, the present date and time, and the quality guarantee period within the database and corresponding to each kind of recording medium.

8. The data management method as claimed in claim 1, wherein the recording medium is a magnetic tape or an optical disk.

9. A data management apparatus for a hierarchical virtual storage system which virtually uses a library apparatus having a plurality of recording media as a portion of a hard disk apparatus, comprising:

a database; and a control part configured to manage loading of the recording media to the library apparatus and unloading of the recording media from the library apparatus in the database in units of a set that is formed by a plurality of recording media, and to form a logical volume, which is a recording unit of a data file with respect to the library apparatus, by a plurality of recording media, and manage the logical volume in the database in correspondence with the set, wherein information managed in the database includes logical volume information that is managed in units of the logical volume, media information that is managed in units of the recording medium, and library information that is managed in units of the library apparatus, wherein:

the logical volume information includes a logical volume ID which is a consecutive number for management that is assigned to each logical volume when newly creating a logical volume, a logical volume number that takes a value of the logical volume number immediately prior to the unloading the logical volume when unloading a recording medium of the logical volume, a logical volume capacity indicating a capacity of the logical volume, a date and time of creation of the logical volume, and storage information including a flag that indicates whether or not the logical volume is unloaded from the library apparatus and the recording medium of the logical volume is in a stored state;

the media information includes a media ID which is a consecutive number for management that is assigned to each recording medium when newly loading the recording medium into the library apparatus, label information indicating a label name of a label adhered to the recording medium, a stored library ID indicating an ID of the library apparatus in which the recording medium is loaded, load information including a flag that indicates whether or not the recording medium is loaded into the library apparatus, logical volume allocation information including a flag that indicates whether or not the recording medium is used as the logical volume, a logical volume ID which is a consecutive number for management that is assigned to each logical volume when newly creating a logical volume, a logical volume constituent number that indicates a constituent number of the recording medium within the set forming the logical volume, and a loaded date and time when each recording medium is newly loaded into the library apparatus; and the library information includes a library ID which is a consecutive number for management that is assigned to the library apparatus when registering the library apparatus with respect to the hierarchical virtual storage system, and a library apparatus name including an apparatus name of the library apparatus.

10. The data management apparatus as claimed in claim 9, wherein the control part, when forming a new logical volume:

judges existence of a vacant recording medium within the library apparatus from the media information;

notifies a message urging a new recording medium to be loaded into the library apparatus if no vacant recording medium exists;

registers the vacant recording medium in the database depending on the loading of the new recording medium into the library apparatus; and updates the database by allocating the vacant recording medium to the new logical volume when the vacant recording medium exists or the vacant recording medium is registered in the database depending on the loading of the new recording medium.

11. The data management apparatus as claimed in claim 9, wherein the control part, when additionally writing to an existing logical volume:

judges whether or not all data to be additionally written are recordable in the recording media forming the existing logical volume;

updates the database by allocating a vacant recording medium to the existing logical volume if the vacant recording medium is loaded in the library apparatus, in a case where not all the data to be additionally written are recordable; and records all the data to be additionally written in the vacant recording medium, in a case where all the data to be additionally written are recordable or, the database is updated by allocating the vacant recording medium to the existing logical volume.

12. The data management apparatus as claimed in claim 9, wherein the control part updates the logical volume information and the media information within the database depending on whether or not a recording medium to be unloaded from the library apparatus is allocated to an existing logical volume, when unloading the recording medium from the library apparatus.

13. The data management apparatus as claimed in claim 9, wherein the control part, when loading the recording medium into the library apparatus:
- updates the media information within the database if the recording medium to be loaded is a new recording medium;
- registers the recording medium to be loaded as a vacant recording medium in the database if the recording medium is not a new recording medium and the recording medium is not allocated to an existing logical volume; and
- updates the logical volume information and the media information within the database if the recording medium to be loaded is not a new recording medium and the recording medium is allocated to the existing logical volume.

14. The data management apparatus as claimed in claim 9, wherein the control part updates the logical volume information and the media information within the database by assigning an unused logical volume number to an existing logical volume when updating the logical volume information and the media information within the database, if an overlap exists between a logical volume number that was assigned to the existing logical volume in the past and logical volume numbers presently managed in the database.

15. The data management apparatus as claimed in claim 14, wherein the control part manages a quality guarantee period of each kind of recording medium, and notifies a message indicating an expiry of the quality guarantee period for a recording medium when a period from a loaded date and time thereof to a present date and time exceeds the quality guarantee period, based on the media information including the loaded date and time and the kind of each recording medium loaded in the library apparatus, the present date and time, and the quality guarantee period within the database and corresponding to each kind of recording medium.

16. The data management apparatus as claimed in claim 9, wherein the recording medium is a magnetic tape or an optical disk.

17. A hierarchical storage apparatus comprising:
- a hard disk apparatus;
- a library apparatus, loadable with a plurality of recording media, and virtually used as a portion of the hard disk; and
- a hierarchical control server including a database and a control part,
- said control part managing loading of the recording media to the library apparatus and unloading of the recording media from the library apparatus in the database in units of a set that is formed by a plurality of recording media, and forming a logical volume, which is a recording unit of a data file with respect to the library apparatus, by a plurality of recording media, and managing the logical volume in the database in correspondence with the set,
- wherein information managed in the database includes logical volume information that is managed in units of the logical volume, media information that is managed in units of the recording medium, and library information that is managed in units of the library apparatus,
wherein:
- the logical volume information includes a logical volume ID which is a consecutive number for management that is assigned to each logical volume when newly creating a logical volume, a logical volume number that takes a value of the logical volume number immediately prior to the unloading the logical volume when unloading a recording medium of the logical volume, a logical volume capacity indicating a capacity of the logical volume, a date and time of creation of the logical volume, and storage information including a flag that indicates whether or not the logical volume is unloaded from the library apparatus and the recording medium of the logical volume is in a stored state;
- the media information includes a media ID which is a consecutive number for management that is assigned to each recording medium when newly loading the recording medium into the library apparatus, label information indicating a label name of a label adhered to the recording medium, a stored library ID indicating an ID of the library apparatus in which the recording medium is loaded, load information including a flag that indicates whether or not the recording medium is loaded into the library apparatus, logical volume allocation information including a flag that indicates whether or not the recording medium is used as the logical volume, a logical volume ID which is a consecutive number for management that is assigned to each logical volume when newly creating a logical volume, a logical volume constituent number that indicates a constituent number of the recording medium within the set forming the logical volume, and a loaded date and time when each recording medium is newly loaded into the library apparatus; and
- the library information includes a library ID which is a consecutive number for management that is assigned to the library apparatus when registering the library apparatus with respect to the hierarchical virtual storage system, and a library apparatus name including an apparatus name of the library apparatus.

18. The hierarchical storage apparatus as claimed in claim 17, wherein the control part, when forming a new logical volume:
- judges existence of a vacant recording medium within the library apparatus from the media information;
- notifies a message urging a new recording medium to be loaded into the library apparatus if no vacant recording medium exists;
- registers the vacant recording medium in the database depending on the loading of the new recording medium into the library apparatus; and
- updates the database by allocating the vacant recording medium to the new logical volume when the vacant recording medium exists or the vacant recording medium is registered in the database depending on the loading of the new recording medium.

19. The hierarchical storage apparatus as claimed in claim 17, wherein the control part, when additionally writing to an existing logical volume:
- judges whether or not all data to be additionally written are recordable in the recording media forming the existing logical volume;
- updates the database by allocating a vacant recording medium to the existing logical volume if the vacant recording medium is loaded in the library apparatus, in a case where not all the data to be additionally written are recordable; and
- records all the data to be additionally written in the vacant recording medium, in a case where all the data to be additionally written are recordable or, the database is updated by allocating the vacant recording medium to the existing logical volume.

20. The hierarchical storage apparatus as claimed in claim 17, wherein the control part updates the logical volume information and the media information within the database depending on whether or not a recording medium to be unloaded from the library apparatus is allocated to an existing logical volume, when unloading the recording medium from the library apparatus.

21. The hierarchical storage apparatus as claimed in claim 17, wherein the control part, when loading the recording medium into the library apparatus:
- updates the media information within the database if the recording medium to be loaded is a new recording medium;
- registers the recording medium to be loaded as a vacant recording medium in the database if the recording medium is not a new recording medium and the recording medium is not allocated to an existing logical volume; and
- updates the logical volume information and the media information within the database if the recording medium to be loaded is not a new recording medium and the recording medium is allocated to the existing logical volume.

22. The hierarchical storage apparatus as claimed in claim 17, wherein the control part updates the logical volume information and the media information within the database by assigning an unused logical volume number to an existing logical volume when updating the logical volume information and the media information within the database, if an overlap exists between a logical volume number that was assigned to the existing logical volume in the past and logical volume numbers presently managed in the database.

23. The hierarchical storage apparatus as claimed in claim 22, wherein the control part manages a quality guarantee period of each kind of recording medium, and notifies a message indicating an expiry of the quality guarantee period for a recording medium when a period from a loaded date and time thereof to a present date and time exceeds the quality guarantee period, based on the media information including the loaded date and time and the kind of each recording medium loaded in the library apparatus, the present date and time, and the quality guarantee period within the database and corresponding to each kind of recording medium.

24. The hierarchical storage apparatus as claimed in claim 17, wherein the recording medium is a magnetic tape or an optical disk.

* * * * *